(12) United States Patent
Abe

(10) Patent No.: US 11,926,176 B2
(45) Date of Patent: Mar. 12, 2024

(54) PNEUMATIC TIRE

(71) Applicant: BRIDGESTONE CORPORATION, Tokyo (JP)

(72) Inventor: Yasunori Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 295 days.

(21) Appl. No.: 17/609,616

(22) PCT Filed: May 27, 2020

(86) PCT No.: PCT/JP2020/021002
§ 371 (c)(1),
(2) Date: Nov. 8, 2021

(87) PCT Pub. No.: WO2020/250690
PCT Pub. Date: Dec. 17, 2020

(65) Prior Publication Data
US 2022/0227178 A1 Jul. 21, 2022

(30) Foreign Application Priority Data
Jun. 14, 2019 (JP) ................................ 2019-110820

(51) Int. Cl.
*B60C 11/12* (2006.01)
*B60C 11/03* (2006.01)
*B60C 11/13* (2006.01)

(52) U.S. Cl.
CPC ...... *B60C 11/1218* (2013.01); *B60C 11/0306* (2013.01); *B60C 11/1259* (2013.01); *B60C 11/1272* (2013.01)

(58) Field of Classification Search
None
See application file for complete search history.

(56) References Cited

U.S. PATENT DOCUMENTS 4,994,126 A * 2/1991 Lagnier ............... B60C 11/1218
152/209.19
5,316,063 A 5/1994 Lagnier
(Continued)

FOREIGN PATENT DOCUMENTS

CN 102421609 A 4/2012
CN 102427956 A 4/2012
(Continued)

OTHER PUBLICATIONS

JP 2000-127716 Machine Translation; Adachi, Masateru (Year: 2000).*

(Continued)

*Primary Examiner* — Katelyn W Smith
*Assistant Examiner* — Nicholas J Weiler
(74) *Attorney, Agent, or Firm* — Oliff PLC

(57) ABSTRACT

A pneumatic tire includes, on a tread surface, circumferential main grooves extending in a tread circumferential direction, and land portions defined between circumferential main grooves adjacent in a tread width direction among the circumferential main grooves, or by a circumferential main groove and a tread edge. The land portions include widthwise grooves (and/or widthwise sipes), extending in the tread width direction, each including a gradually decreasing groove (sipe) width portion in which a groove (sipe) width gradually decreases from the tread surface towards an inner side in the tire radial direction, a constant groove (sipe) width portion that extends from the gradually decreasing groove (sipe) width portion towards the inner side in the tire radial direction and has a constant groove (sipe) width, and a branched groove (sipe) portion branching and extending from the constant groove (sipe) width portion towards the inner side in the tire radial direction.

3 Claims, 2 Drawing Sheets

(56) References Cited

U.S. PATENT DOCUMENTS

| | | |
|---|---|---|
| 6,000,451 A | 12/1999 | Takada |
| 6,408,910 B1 | 6/2002 | Lagnier et al. |
| 6,408,911 B1 | 6/2002 | Tanabe et al. |
| 9,308,780 B2 | 4/2016 | Palgen |
| 9,981,507 B2 | 5/2018 | Warfford et al. |
| 11,364,745 B2 | 6/2022 | Shimizu |
| 11,400,762 B2 | 8/2022 | Kuriyama |
| 11,511,571 B2 | 11/2022 | Pizzorno et al. |
| 2008/0073012 A1 | 3/2008 | Miyazaki |
| 2011/0180191 A1 | 7/2011 | Christenbury |
| 2012/0048439 A1 | 3/2012 | Christenbury |
| 2012/0055601 A1 | 3/2012 | Christenbury |
| 2012/0168049 A1 | 7/2012 | Jenkins et al. |
| 2012/0227883 A1 | 9/2012 | Audigier et al. |
| 2013/0213542 A1 | 8/2013 | Warfford et al. |
| 2014/0150944 A1* | 6/2014 | Yamashita ......... B60C 11/1346 152/209.1 |
| 2017/0136827 A1 | 5/2017 | Sato |
| 2018/0162166 A1 | 6/2018 | Hiraishi |

FOREIGN PATENT DOCUMENTS

| | | | |
|---|---|---|---|
| CN | 102844203 A | | 12/2012 |
| CN | 109219531 A | | 1/2019 |
| CN | 109414964 A | | 3/2019 |
| EP | 2000329 A1 * | 12/2008 | ............. B60C 11/12 |
| EP | 3 208 113 A1 | | 8/2017 |
| IN | 103180152 A | | 6/2013 |
| JP | S57-127005 U | | 8/1982 |
| JP | H02-227306 A | | 9/1990 |
| JP | H05-338417 A | | 12/1993 |
| JP | H09-150609 A | | 6/1997 |
| JP | 2000127716 A * | | 5/2000 |
| JP | 2001-130227 A | | 5/2001 |
| JP | 2001225611 A | | 8/2001 |
| JP | 2002-501458 A | | 1/2002 |
| JP | 2008-074346 A | | 4/2008 |
| JP | 2012-529392 A | | 11/2012 |
| JP | 2013-505874 A | | 2/2013 |
| JP | 2013-540077 A | | 10/2013 |
| WO | 2018/015832 A1 | | 1/2018 |
| WO | 2018/118023 A1 | | 6/2018 |
| WO | 2018/131475 A1 | | 7/2018 |
| WO | 2019/035847 A1 | | 2/2019 |

OTHER PUBLICATIONS

EP 2000329 Machine Translation, Bolz, Gerrit (Year: 2008).*
Jul. 21, 2020 International Search Report issued in International Patent Application No. PCT/JP2020/021002.
Dec. 14, 2021 International Preliminary Report on Patentability issued in International Patent Application No. PCT/JP2020/021002.
Dec. 8, 2022 Search Report issued in Chinese Application No. 202080040276.6.
Jun. 1, 2023 Search Report Issued in Chinese Patent Application No. 202080040276.6.
Jun. 2, 2023 Extended European Search Report Issued in European Patent Application No. 20822733.

* cited by examiner

PNEUMATIC TIRE

TECHNICAL FIELD

The present disclosure relates to a pneumatic tire.

BACKGROUND

A sipe that is branched on the inner side in the tire radial direction has been proposed. For example, see Patent Literature (PTL) 1. According to such a configuration, the drainage performance when wear progresses can be improved.

CITATION LIST

Patent Literature

PTL 1: JP 2012-529392 A

SUMMARY

Technical Problem

In pneumatic tires having sipes such as those described above, a high level of compatibility between drainage performance and wear resistance from when the tire is new to the early stage of wear has also been desired. This may similarly be an issue in pneumatic tires having grooves that are branched on the inner side in the tire radial direction.

The present disclosure aims to provide a pneumatic tire capable of achieving a high level of compatibility between drainage performance and wear resistance from when the tire is new to the early stage of wear, while improving the drainage performance when wear progresses.

Solution to Problem (1) A pneumatic tire includes, on a tread surface, a plurality of circumferential main grooves extending in a tread circumferential direction, and a plurality of land portions, each land portion being defined between circumferential main grooves adjacent in a tread width direction among the plurality of circumferential main grooves, or by the circumferential main groove and a tread edge, wherein
the land portion includes a plurality of widthwise grooves extending in the tread width direction, and
the widthwise groove includes a gradually decreasing groove width portion in which a groove width gradually decreases from the tread surface towards an inner side in a tire radial direction, a constant groove width portion that extends from the gradually decreasing groove width portion towards the inner side in the tire radial direction and has a constant groove width, and a branched groove portion that branches and extends from the constant groove width portion towards the inner side in the tire radial direction.

According to this configuration, a high level of compatibility can be achieved between drainage performance and wear resistance from when the tire is new to the early stage of wear, while improving the drainage performance when wear progresses.

Here, the "tread surface" refers to the entire tread surface in the tread circumferential direction that comes into contact with the road surface when the pneumatic tire is mounted on an applicable rim, filled to a prescribed internal pressure, and subjected to the maximum load.

The "circumferential main groove" refers to a groove extending in the tread circumferential direction and having an opening width of 2 mm or more at the aforementioned tread surface when the pneumatic tire is mounted on an applicable rim, filled to a prescribed internal pressure, and under no load.

The "tread edges" refer to the outermost points of the aforementioned tread surface on both sides in the tire width direction.

The "widthwise groove" refers to a groove extending in the tread width direction and having an opening width of 2 mm or more at the aforementioned tread surface when the pneumatic tire is mounted on an applicable rim, filled to a prescribed internal pressure, and under no load.

The "widthwise sipe" described below refers to a sipe extending in the tread width direction and having an opening width of less than 2 mm at the aforementioned tread surface when the pneumatic tire is mounted on an applicable rim, filled to a prescribed internal pressure, and under no load. In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "specified internal pressure" refers to the air pressure (maximum air pressure) corresponding to the maximum load capability prescribed for each vehicle on which the tire is mounted.

The "maximum load" refers to the load corresponding to the aforementioned maximum load capability.

Advantageous Effect

According to the present disclosure, a pneumatic tire capable of achieving a high level of compatibility between drainage performance and wear resistance from when the tire is new to the early stage of wear, while improving the drainage performance when wear progresses, can be provided.

DETAILED DESCRIPTION

Embodiments of the present disclosure are described below in detail with reference to the drawings.

The internal structure and the like of the pneumatic tire (hereinafter referred to simply as the tire) can be the same as those of conventional tires. As an example, the tire can have a pair of bead portions, a pair of sidewall portions connected to the pair of bead portions, and a tread portion disposed between the pair of sidewall portions. The tire can also have a carcass extending toroidally between the pair of bead portions and a belt disposed on the radially outward side of a crown portion of the carcass.

Unless otherwise specified, the dimensions and the like refer to the dimensions and the like when the tire is mounted on an applicable rim, filled to the prescribed internal pressure, and under no load.

Figure 1:
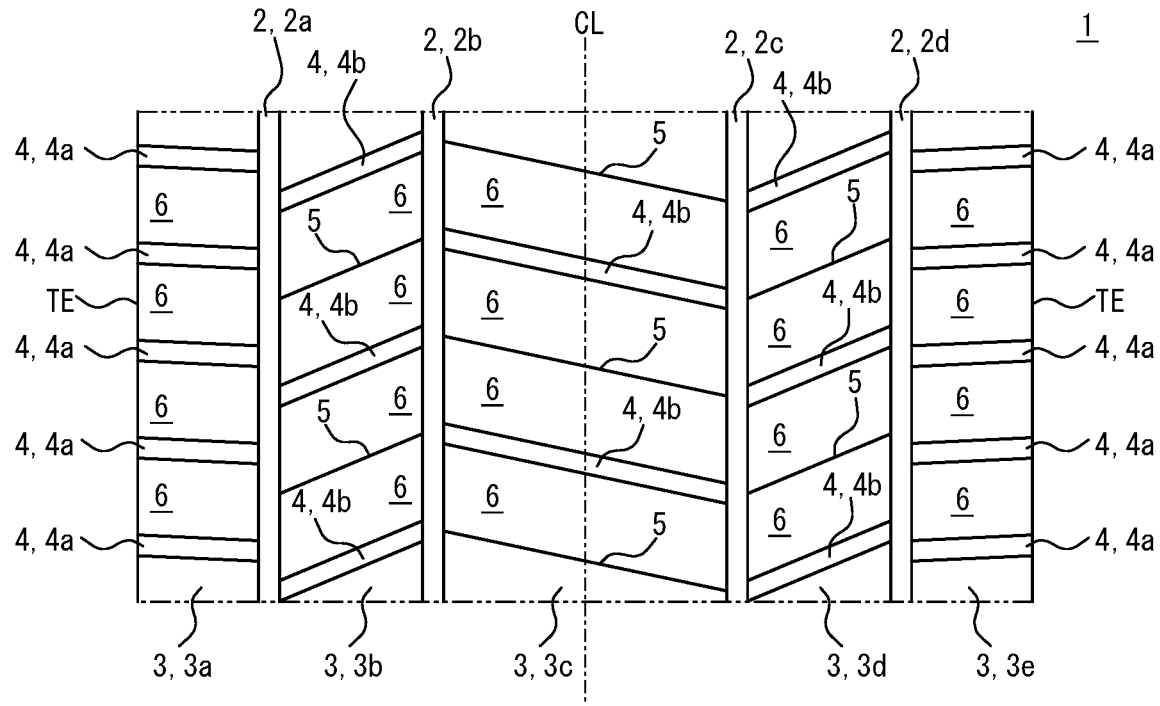
FIG. 1 is a developed view schematically illustrating a tread pattern of a pneumatic tire according to an embodiment of the present disclosure.

FIG. 1 is a developed view schematically illustrating a tread pattern of a pneumatic tire according to an embodiment of the present disclosure.

As illustrated in FIG. 1, the tire of the present example includes, on the tread surface 1, a plurality (four in the illustrated example) of circumferential main grooves 2 (2a, 2b, 2c, 2d) extending in the tread circumferential direction, and a plurality (five in the illustrated example) of land portions 3 (3a, 3b, 3c, 3d, 3e) defined by circumferential main grooves 2 adjacent in the tread width direction among the plurality of circumferential main grooves 2, or by the circumferential main grooves 2 (2a, 2d) and the tread edges TE. In the present example, two circumferential main grooves 2a, 2b are positioned in a half portion on one side, in the tread width direction, bordered by the tire equatorial plane CL, and two circumferential main grooves 2c, 2d are positioned in a half portion on the other side, in the tread width direction, bordered by the tire equatorial plane CL. In this example, the land portion 3c is located on the tire equatorial plane CL, and four land portions 3 (3a, 3b, 3d, 3e) are located in the half portions in the tread width direction. In the present example, the land portion 3c is located on the tire equatorial plane CL, but a configuration in which a circumferential main groove 2 is located on the tire equatorial plane CL may be adopted.

In the example illustrated in FIG. 1, the number of circumferential main grooves 2 is four, but the number can be three or less (one to three) or can be five or more. Accordingly, the number of land portions 3 can also be four or less (two to four), or can be six or more. In the present example, all of the land portions are block-like land portions 3, but at least one of the land portions may be a rib-like land portion. A "rib-like land portion" refers to a land portion that is not completely divided in the tread circumferential direction by a widthwise groove or widthwise sipe extending in the tread width direction.

The groove width (opening width (opening width measured perpendicular to the extending direction of the groove in plan view)) of the circumferential main groove 2 is not particularly limited, since the groove width depends on the number of circumferential main grooves 2, but can, for example, be between 3 mm and 15 mm. Similarly, the groove depth (maximum depth) of the circumferential main groove 2 is not particularly limited, but can, for example, be between 14 mm and 20 mm.

In the illustrated example, the circumferential main grooves 2 all extend along the tread circumferential direction (without inclination) in plan view of the tread surface 1, but at least one of the circumferential main grooves 2 may extend at an inclination relative to the tread circumferential direction. In this case, the circumferential main groove 2 may be inclined at an angle of, for example, 5° or less relative to the tread circumferential direction. In the illustrated example, all of the circumferential main grooves 2 extend straight in the tread circumferential direction, but at least one of the circumferential main grooves 2 may have a shape such as a zigzag shape or a curved shape.

In the illustrated example, each land portion 3 includes a plurality of widthwise grooves 4 extending in the tread width direction. Specifically, in the present embodiment, the land portions 3a, 3e adjacent to the tread edges TE have a plurality of widthwise grooves 4a (five each in the land portions 3a, 3e in the illustrated range) extending inwards in the tread width direction from the tread edge TE and opening to the circumferential main grooves 2a, 2d, respectively. The land portion 3c on the tire equatorial plane CL and the land portions 3b, 3d located between the land portion 3c and the land portions 3a, 3e have a plurality of widthwise grooves 4b (three in the land portions 3b, 3d and two in the land portion 3c in the illustrated range) that connect the two circumferential main grooves 2 that define these land portions 3. The number of the widthwise grooves 4 (4a, 4b) can be appropriately set. In the illustrated example, all of the land portions 3 include the widthwise grooves 4. When the widthwise grooves 4 are included on the tread surface 1, however, it suffices for any land portion 3 to include the widthwise grooves 4.

Here, the groove width (opening width (opening width measured perpendicular to the extending direction of the groove in plan view)) of the widthwise groove 4 is not particularly limited, since the groove width depends on the number of widthwise grooves 4, but can, for example, be between 5 mm and 10 mm. Similarly, the groove depth (maximum depth) of the widthwise groove 4 is not particularly limited, but can, for example, be between 14 mm and 20 mm.

In the illustrated example, the widthwise grooves 4 extend at an inclination relative to the tread width direction in each land portion 3, but the widthwise grooves 4 may extend along or at an inclination relative to the tread width direction in each land portion 3. In the case in which the widthwise grooves 4 extend at an inclination relative to the tread width direction, the widthwise grooves 4 are preferably inclined relative to the tread width direction at an inclination angle of 45° or less, and are preferably inclined at an inclination angle of 30° or less. As illustrated, the inclination angle of the widthwise grooves 4 relative to the tread width direction can differ between land portions 3 (in the present example, the inclination angle of the widthwise grooves 4a in the land portions 3a, 3e relative to the tread width direction is smaller than the inclination angle of the widthwise grooves 4b in the land portions 3b, 3c, 3d relative to the tread width direction). The inclination angles of the plurality of widthwise grooves 4 relative to the tread width direction can also be the same or different even within a land portion 3.

In the illustrated example, all of the widthwise grooves 4 extend straight in the tread width direction, but at least one of the widthwise grooves 4 may have a bent portion.

Here, to improve the drainage performance, the widthwise grooves 4 preferably open at a tread edge TE and/or a circumferential main groove 2, for example, as in the illustrated example. On the other hand, to increase the rigidity of the land portion 3, the widthwise grooves 4 can be configured not to open to either the tread edge TE or the circumferential main groove 2, so that both ends terminate in the land portion 3. Also, in the land portion 3 defined between two circumferential main grooves 2 adjacent in the tread width direction, the widthwise groove 4 may open to either of the two circumferential main grooves 2.

In the illustrated example, the land portions 3a, 3e do not include sipes. On the other hand, in the illustrated example, the land portions 3b, 3c, 3d have a plurality of sipes 5 (two in the land portions 3b, 3d and in the land portion 3c in the illustrated range). In the illustrated example, the sipes 5 are widthwise sipes 5 extending in the tread width direction. The number of the widthwise sipes 5 can be appropriately set. In the illustrated example, the land portions 3b, 3c, 3d include the widthwise sipes 5, but in the case in which the widthwise sipes 5 are included on the tread surface 1, it suffices for any land portion 3 to include the widthwise sipes 5.

Here, the sipe width (opening width (opening width measured perpendicular to the extending direction of the sipe)) of the widthwise sipe 5 is not particularly limited, since the sipe width depends on the number of widthwise sipes 5, but can, for example, be between 0.6 mm and 1.2 mm. Similarly, the sipe depth (maximum depth) of the widthwise sipe 5 is not particularly limited, but can, for example, be between 14 mm and 20 mm.

In the illustrated example, each sipe 5 of the land portions 3b, 3c, 3d is a widthwise sipe extending at an inclination relative to the tread width direction, but each sipe 5 may also be a widthwise sipe extending along the tread width direction. In the case in which the widthwise sipes 5 extend at an inclination relative to the tread width direction, the widthwise sipes 5 are preferably inclined relative to the tread width direction at an inclination angle of 45° or less, and are preferably inclined at an inclination angle of 30° or less. The inclination angle of the widthwise sipes 5 relative to the tread width direction can differ between land portions 3 (in the present example, the inclination angle of the widthwise sipes 5 in the land portions 3b, 3c, 3d relative to the tread width direction is the same). The inclination angles of the plurality of widthwise sipes 5 relative to the tread width direction can also be the same or different even within a land portion 3.

In the illustrated example, all of the widthwise sipes 5 extend straight in the tread width direction, but at least one of the widthwise sipes 5 may have a bent portion.

Here, to improve the drainage performance, the widthwise sipes 5 preferably open at a tread edge TE and/or a circumferential main groove 2. On the other hand, to increase the rigidity of the land portion 3, the widthwise sipes 5 can be configured not to open to either the tread edge TE or the circumferential main groove 2, so that both ends terminate in the land portion 3. Also, in the land portion 3 defined between two circumferential main grooves 2 adjacent in the tread width direction, the widthwise sipe 5 may open to either of the two circumferential main grooves 2.

In the illustrated example, the widthwise grooves 4 and the widthwise sipes 5 in the land portions 3b, 3c, 3d are arranged alternately in the tread circumferential direction. On the other hand, in the case in which the land portions 3 include both the widthwise grooves 4 and the widthwise sipes 5, there may be a point at which two or more widthwise grooves 4 are arranged continuously between two adjacent widthwise sipes 5 in the tread circumferential direction, and there may be a point at which two or more widthwise sipes 5 are arranged continuously between two adjacent widthwise grooves 4 in the tread circumferential direction.

In the illustrated example, the widthwise grooves 4b in the land portion 3b, the widthwise sipes 5 in the land portion 3c, and the widthwise grooves 4b in the land portion 3d are connected. As a result, while the drainage performance is improved, a reduction in the rigidity of the land portions 3 can be suppressed as compared to the case in which all of the widthwise grooves 4 are connected. In the illustrated example, the widthwise grooves 4b in the land portions 3b, 3d and the widthwise sipes 5 in the land portion 3c are inclined in opposite directions relative to the tread width direction, thereby better optimizing the balance of the rigidity of the land portions.

In the illustrated example, the widthwise sipes 5 in the land portion 3b, the widthwise grooves 4b in the land portion 3c, and the widthwise sipes 5 in the land portion 3d are connected. As a result, while the drainage performance is improved, a reduction in the rigidity of the land portions 3 can be suppressed as compared to the case in which all of the widthwise grooves 4 are connected. In the illustrated example, the widthwise sipes 5 in the land portions 3b, 3d and the widthwise grooves 4 in the land portion 3c are inclined in opposite directions relative to the tread width direction, thereby better optimizing the balance of the rigidity of the land portions.

However, the widthwise grooves 4 and the widthwise sipes 5 need not necessarily be connected between adjacent land portions 3. The widthwise grooves 4 and the widthwise sipes 5 can also be inclined in the same direction relative to the tread width direction between adjacent land portions 3.

Here, the widthwise grooves 4 of each land portion 3 may have overlapping portions with the widthwise grooves 4 and widthwise sipes 5 of another land portion 3 when projected in the tread width direction, or may be arranged so as not to overlap.

In the illustrated example, blocks 6 are defined by two widthwise grooves 4 adjacent in the tread circumferential direction in the land portions 3a, 3e. Furthermore, in the illustrated example, blocks 6 are defined by a widthwise groove 4 and a widthwise sipe 5 adjacent in the tread circumferential direction in the land portions 3b, 3c, 3d.

Figure 2:
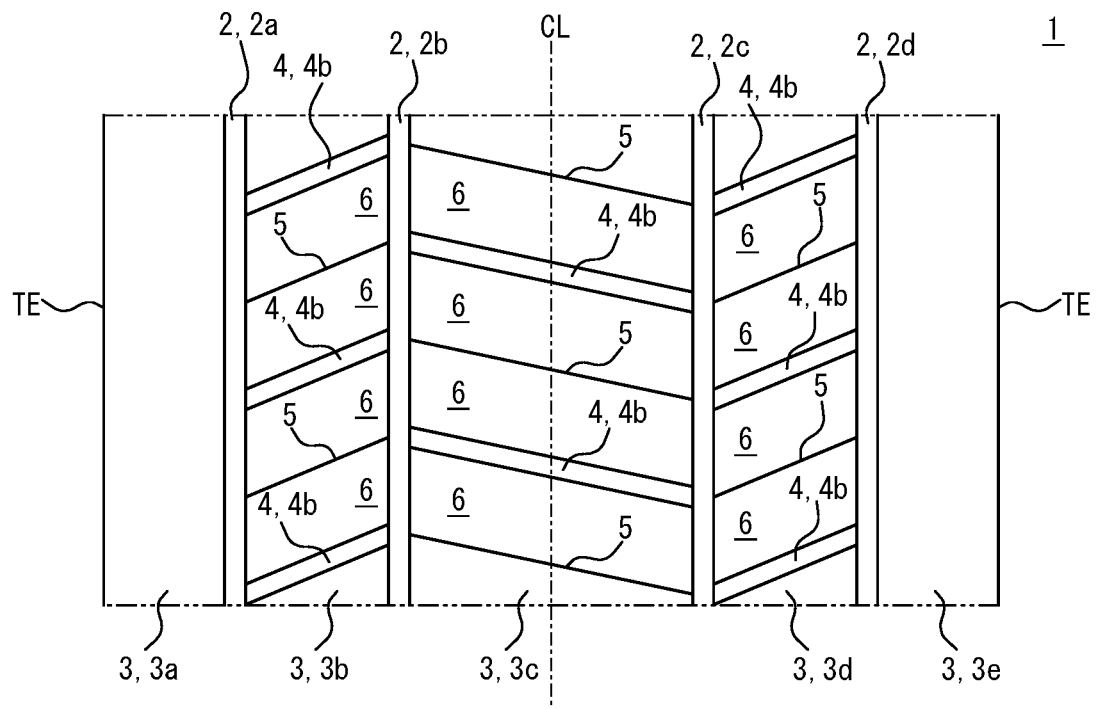
FIG. 2 is a developed view schematically illustrating another example of a tread pattern.

FIG. 2 is a developed view schematically illustrating another example of a tread pattern. The example illustrated in FIG. 2 differs from the example tread pattern illustrated in FIG. 1 in that the land portions 3a, 3e adjacent to the tread edges TE have neither widthwise grooves 4 nor widthwise sipes 5. That is, the land portions 3a, 3b are rib-like land portions.

Figure 3:
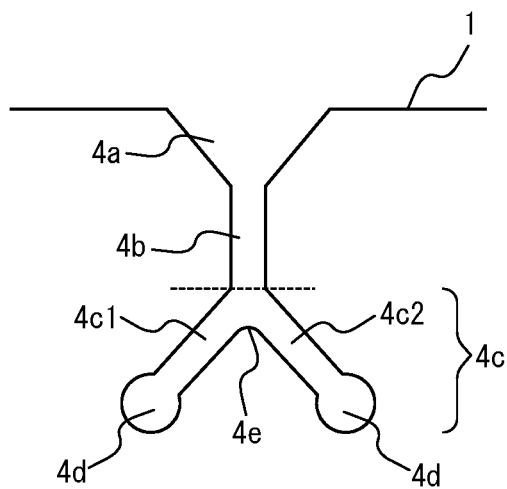
FIG. 3 is a cross-sectional view schematically illustrating an example of a widthwise groove.

FIG. 3 is a cross-sectional view schematically illustrating an example of a widthwise groove. FIG. 3 is a cross-sectional view of the widthwise groove in a cross-section orthogonal to the extending direction. FIG. 3 illustrates a state in which the tire is mounted on an applicable rim, filled to the prescribed internal pressure, and under no load.

As illustrated in FIG. 3, in the present embodiment, the widthwise groove 4 includes a gradually decreasing groove width portion 4a in which the groove width gradually decreases from the tread surface 1 towards the inner side in the tire radial direction, a constant groove width portion 4b that extends from the gradually decreasing groove width portion 4a towards the inner side in the tire radial direction and has a constant groove width, and a branched groove portion 4c that branches and extends from the constant groove width portion 4b towards the inner side in the tire radial direction.

In the illustrated example, the gradually decreasing groove width portion 4a has a constant rate of decrease of the groove width (a straight groove wall in this cross-sectional view) towards the inner side in the tire radial direction. On the other hand, the gradually decreasing groove width portion 4a may have a varying rate of decrease of the groove width towards the inner side in the tire radial direction. The rate of change of the groove width may, for example, gradually decrease or increase. Alternatively, the groove width of the gradually decreasing groove width portion 4a may decrease stepwise towards the inner side in the tire radial direction.

The groove wall on one side in the tread circumferential direction and the groove wall on the other side have symmetrical shapes in the illustrated example but may have different shapes, and the inclination angle, relative to the tire radial direction, of the groove wall on one side in the tread circumferential direction may be larger or smaller than the inclination angle, relative to the tire radial direction, of the groove wall on the other side in the tread circumferential direction.

The extension length in the groove depth direction of the gradually decreasing groove width portion 4a can be 25% to 50% of the extension length in the depth direction of the entire widthwise groove 4.

The groove width of the constant groove width portion 4b is preferably 2 mm to 3 mm. The constant groove width portion 4b has a constant groove width but need only have a substantially constant groove width, and may include a portion in which the groove width varies slightly, as long as the difference between the maximum and minimum values of the groove width of the constant groove width portion 4b is 0.2 mm or less. The extension length in the groove depth direction of the constant groove width portion 4b can be from greater than 0% to 25% of the extension length in the depth direction of the entire widthwise groove 4.

In the illustrated example, the constant groove width portion 4b extends along a direction perpendicular to the tread surface 1 in this cross-sectional view but may instead extend at an inclination relative to the direction perpendicular to the tread surface 1.

The branched groove portion 4c is formed by (only) two branched grooves 4c1, 4c2 in the illustrated example. The branched groove portion 4c may, however, have three or more branched grooves. In the illustrated example, the branched grooves 4c1, 4c2 each have a substantially constant groove width, except for a widened portion 4d at the groove bottom. This widened portion 4d can suppress the occurrence of cracks at the groove bottom. In the illustrated example, the widened portion 4d is substantially spherical and is substantially circular in this cross-sectional view. The widened portion 4d can have any of various shapes having a larger groove width than the groove width of the branched grooves 4c1, 4c2. In this cross-sectional view, the maximum diameter of the widened portion 4d is not particularly limited, but can be 1.5 to 2 times the groove width (maximum width) of the branched grooves 4c1, 4c2. The branched grooves 4c1, 4c2 do not necessarily include the widened portion 4d. The groove width of the branched grooves 4c1, 4c2 may vary towards the inner side in the tire radial direction.

The length in the extending direction of the branched groove portion 4c can be 25% to 50% of the extension length in the depth direction of the entire widthwise groove 4. The groove width of the branched grooves 4c1, 4c2 can be the same as the groove width of the constant groove width portion 4b or can be larger or smaller than the groove width of the constant groove width portion 4b.

In the illustrated example, the branched groove 4c1 is inclined to one side in the tread circumferential direction from the outer side towards the inner side in the tire radial direction, and the branched groove 4c2 is inclined to the other side in the tread circumferential direction from the outer side towards the inner side in the tire radial direction. In the case of two branched grooves, the direction of the inclination angle relative to the tread circumferential direction from the outer side towards the inner side in the tire radial direction preferably differs in this way between the two branched grooves.

In the illustrated example, the branched grooves 4c1, 4c2 have a similar shape, except for the aforementioned direction of the inclination angle relative to the tread circumferential direction from the outer side towards the inner side in the tire radial direction. The shapes can, however, differ between the branched grooves, and the groove width, extension length, presence or absence of a widened portion, and/or other shapes and the like can differ.

In the illustrated example, an intersection 4e between the two branched grooves 4c1, 4c2 is rounded on the inner side in the tire radial direction. The occurrence of cracks at the intersection 4e can thereby be suppressed, and the durability of the tire can be improved.

In this cross-sectional view, the groove wall portions with an obtuse angle between the gradually decreasing groove width portion 4a and the constant groove width portion 4b, and the groove wall portions with an obtuse angle between the constant groove width portion 4b and the branched grooves 4c1, 4c2, can also be rounded. The occurrence of cracks at these portions can thereby be suppressed, and the durability of the tire can be improved.

In the present example, the type of tread rubber differs between an outer region in the tire radial direction and an inner region in the tire radial direction bounded by the tire radial position of the outermost end of the branched groove portion 4c in the tire radial direction or by a position farther towards the outer side in the tire radial direction than the tire radial position. For example, the type of tread rubber differs between the outer region in the tire radial direction and the inner region in the tire radial direction bounded by the tire radial position of the outermost end of the branched groove portion 4c in the tire radial direction, the boundary being indicated by the dotted line.

In the present example, all of the widthwise grooves 4 on the tread surface 1 have the configuration illustrated in FIG. 3.

Figure 4:
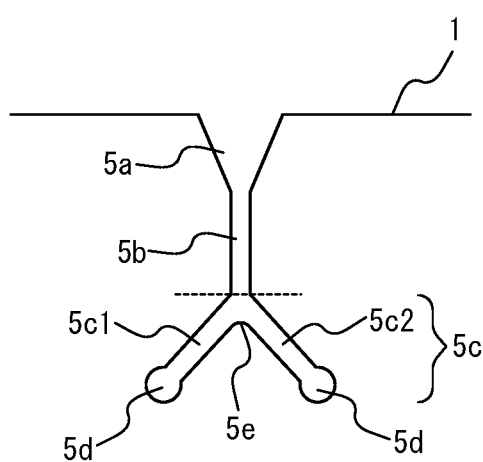
FIG. 4 is a cross-sectional view schematically illustrating an example of a widthwise sipe.

FIG. 4 is a cross-sectional view schematically illustrating an example of a widthwise sipe. FIG. 4 is a cross-sectional view of the widthwise sipe in a cross-section orthogonal to the extending direction. FIG. 4 illustrates a state in which the tire is mounted on an applicable rim, filled to the prescribed internal pressure, and under no load.

As illustrated in FIG. 4, in the present embodiment, the widthwise sipe 5 includes a gradually decreasing sipe width portion 5a in which the sipe width gradually decreases from the tread surface 1 towards the inner side in the tire radial direction, a constant sipe width portion 5b that extends from the gradually decreasing sipe width portion 5a towards the inner side in the tire radial direction and has a constant sipe width, and a branched sipe portion 5c that branches and extends from the constant sipe width portion 5b towards the inner side in the tire radial direction.

In the illustrated example, the gradually decreasing sipe width portion 5a has a constant rate of decrease of the sipe width (a straight sipe wall in this cross-sectional view) towards the inner side in the tire radial direction. On the other hand, the gradually decreasing sipe width portion 5a may have a varying rate of decrease of the sipe width towards the inner side in the tire radial direction. The rate of change of the sipe width may, for example, gradually decrease or increase. Alternatively, the sipe width of the gradually decreasing sipe width portion 5a may decrease stepwise towards the inner side in the tire radial direction.

The sipe wall on one side in the tread circumferential direction and the sipe wall on the other side have symmetrical shapes in the illustrated example but may have different shapes, and the inclination angle, relative to the tire radial direction, of the sipe wall on one side in the tread circumferential direction may be larger or smaller than the inclination angle, relative to the tire radial direction, of the sipe wall on the other side in the tread circumferential direction.

The extension length in the sipe depth direction of the gradually decreasing sipe width portion 5a can be 25% to 50% of the extension length in the depth direction of the entire widthwise sipe 5.

The sipe width of the constant sipe width portion 5b is preferably 0.5 mm to 1.1 mm. The constant sipe width portion 5b has a constant sipe width but need only have a substantially constant sipe width, and may include a portion in which the sipe width varies slightly, as long as the difference between the maximum and minimum values of the sipe width of the constant sipe width portion 5b is 0.2 mm or less. The extension length in the sipe depth direction of the constant sipe width portion 5b can be 25% to 50% of the extension length in the depth direction of the entire widthwise sipe 5.

In the illustrated example, the constant sipe width portion 5b extends along a direction perpendicular to the tread surface 1 in this cross-sectional view but may instead extend at an inclination relative to the direction perpendicular to the tread surface 1.

The branched sipe portion 5c is formed by (only) two branched sipes 5c1, 5c2 in the illustrated example. The branched sipe portion 5c may, however, have three or more branched sipes. In the illustrated example, the branched sipes 5c1, 5c2 each have a substantially constant sipe width, except for a widened portion 5d at the sipe bottom. This widened portion 5d can suppress the occurrence of cracks at the sipe bottom. In the illustrated example, the widened portion 5d is substantially spherical and is substantially circular in this cross-sectional view. The widened portion 5d can have any of various shapes having a larger sipe width than the sipe width of the branched sipes 5c1, 5c2. In this cross-sectional view, the maximum diameter of the widened portion 5d is not particularly limited, but can be 1.5 to 2 times the sipe width (maximum width) of the branched sipes 5c1, 5c2. The branched sipes 5c1, 5c2 do not necessarily include the widened portion 5d. The sipe width of the branched sipes 5c1, 5c2 may vary towards the inner side in the tire radial direction. The length in the extending direction of the branched sipe portion 5c can be 25% to 50% of the extension length in the depth direction of the entire widthwise sipe 5. The sipe width of the branched sipes 5c1, 5c2 can be the same as the sipe width of the constant sipe width portion 5b or can be larger or smaller than the sipe width of the constant sipe width portion 5b.

In the illustrated example, the branched sipe 5c1 is inclined to one side in the tread circumferential direction from the outer side towards the inner side in the tire radial direction, and the branched sipe 5c2 is inclined to the other side in the tread circumferential direction from the outer side towards the inner side in the tire radial direction. In the case of two branched sipes, the direction of the inclination angle relative to the tread circumferential direction from the outer side towards the inner side in the tire radial direction preferably differs in this way between the two branched sipes.

In the illustrated example, the branched sipes 5c1, 5c2 have a similar shape, except for the aforementioned direction of the inclination angle relative to the tread circumferential direction from the outer side towards the inner side in the tire radial direction. The shapes can, however, differ between the branched sipes, and the sipe width, extension length, presence or absence of a widened portion, and/or other shapes and the like can differ.

In the illustrated example, an intersection 5e between the two branched sipes 5c1, 5c2 is rounded on the inner side in the tire radial direction. The occurrence of cracks at the intersection 5e can thereby be suppressed, and the durability of the tire can be improved.

In this cross-sectional view, the sipe wall portions with an obtuse angle between the gradually decreasing sipe width portion 5a and the constant sipe width portion 5b, and the sipe wall portions with an obtuse angle between the constant sipe width portion 5b and the branched sipes 5c1, 5c2, can also be rounded. The occurrence of cracks at these portions can thereby be suppressed, and the durability of the tire can be improved.

In the present example, the type of tread rubber differs between an outer region in the tire radial direction and an inner region in the tire radial direction bounded by the tire radial position of the outermost end of the branched sipe portion 5c in the tire radial direction or by a position farther towards the outer side in the tire radial direction than the tire radial position. For example, the type of tread rubber differs between the outer region in the tire radial direction and the inner region in the tire radial direction bounded by the tire radial position of the outermost end of the branched sipe portion 5c in the tire radial direction, the boundary being indicated by the dotted line.

In the present example, all of the widthwise sipes 5 on the tread surface 1 have the configuration illustrated in FIG. 5.

The effects of the pneumatic tire according to the present embodiment are described below.

The pneumatic tire of the present embodiment includes a plurality of widthwise grooves 4 extending in the tread width direction in the land portions 3, and each widthwise groove 4 includes the branched groove portion 4c that branches and extends from the constant groove width portion 4b towards the inner side in the tire radial direction. As a result, the drainage performance can be improved by the (in this example, two) branched grooves 4c1, 4c2 when wear progresses. The edge component in the tread width direction (edge component relative to the tread circumferential direction) can also be increased, thereby improving the wet performance. The shear force acting on the land portions 3 can also be reduced to improve wear resistance.

In the pneumatic tire of the present embodiment, the widthwise groove 4 includes the gradually decreasing groove width portion 4a, in which the groove width gradually decreases from the tread surface 1 towards the inner side in the tire radial direction, and the constant groove width portion 4b that extends from the gradually decreasing groove width portion 4a towards the inner side in the tire radial direction and has a constant groove width.

As a result, from when the tire is new, with the gradually decreasing groove width portion 4a exposed, to the early stage of wear, the drainage performance is improved by virtue of the larger opening width (as compared, for example, to a groove with the same groove volume and a constant groove width), while also securing the rigidity of the land portions 3 and improving the wear resistance by virtue of the land portions 3, defined by the decreasing groove width portions 4a, being formed at an obtuse angle in a cross-sectional view. In this way, a high level of compatibility can be achieved between drainage performance and wear resistance from when the tire is new to the early stage of wear. The same effects as those of an ordinary widthwise groove with a constant groove width can be achieved in the middle stage of wear, in which the constant groove width portion 4b is exposed.

In the present embodiment, each sipe 5 has the configuration illustrated in FIG. 4. However, in the present disclosure, a configuration may be adopted in which the widthwise groove includes the gradually decreasing groove width portion in which the groove width gradually decreases from the tread surface towards the inner side in the tire radial direction, the constant groove width portion that extends from the gradually decreasing groove width portion towards the inner side in the tire radial direction and has a constant groove width, and the branched groove portion that branches and extends from the constant groove width portion towards the inner side in the tire radial direction, while the sipes are omitted or configured as ordinary sipes. In this case, the above-described effects relating to the widthwise groove can be achieved.

In the present example, all of the widthwise grooves 4 on the tread surface 1 have the configuration illustrated in FIG. 3. As long as one or more of the widthwise grooves 4 on the tread surface 1, however, includes the gradually decreasing groove width portion in which the groove width gradually decreases from the tread surface towards the inner side in the tire radial direction, the constant groove width portion that extends from the gradually decreasing groove width portion towards the inner side in the tire radial direction and has a constant groove width, and the branched groove portion that branches and extends from the constant groove width portion towards the inner side in the tire radial direction, then the effects described above with regard to the widthwise groove can be achieved.

For example, if in only one of the land portions, the widthwise groove 4 includes the gradually decreasing groove width portion in which the groove width gradually decreases from the tread surface towards the inner side in the tire radial direction, the constant groove width portion that extends from the gradually decreasing groove width portion towards the inner side in the tire radial direction and has a constant groove width, and the branched groove portion that branches and extends from the constant groove width portion towards the inner side in the tire radial direction, then in that land portion, the effects described above with regard to the widthwise groove can be achieved.

Next, the pneumatic tire of the present embodiment includes a plurality of widthwise sipes 5 extending in the tread width direction in the land portions 3, and each widthwise sipe 5 includes the branched sipe portion 5c extending from the constant sipe width portion 5b towards the inner side in the tire radial direction. As a result, the drainage performance can be improved by the (in this example, two) branched sipes 5c1, 5c2 when wear progresses. The edge component in the tread width direction (edge component relative to the tread circumferential direction) can also be increased, thereby improving the wet performance. The shear force acting on the land portions 3 can also be reduced to improve wear resistance.

In the pneumatic tire of the present embodiment, the widthwise sipe 5 includes the gradually decreasing sipe width portion 5a, in which the sipe width gradually decreases from the tread surface 1 towards the inner side in the tire radial direction, and the constant sipe width portion 5b that extends from the gradually decreasing sipe width portion 5a towards the inner side in the tire radial direction and has a constant sipe width.

As a result, from when the tire is new, with the gradually decreasing sipe width portion 5a exposed, to the early stage of wear, the drainage performance is improved by virtue of the larger opening width (as compared, for example, to a sipe with the same sipe volume and a constant sipe width), while also securing the rigidity of the land portions 3 and improving the wear resistance by virtue of the land portions 3, defined by the decreasing sipe width portions 5a, being formed at an obtuse angle in a cross-sectional view. In this way, a high level of compatibility can be achieved between drainage performance and wear resistance from when the tire is new to the early stage of wear. The same effects as those of an ordinary widthwise sipe with a constant sipe width can be achieved in the middle stage of wear, in which the constant sipe width portion 5b is exposed.

In the present embodiment, the widthwise groove 4 has the configuration illustrated in FIG. 3. However, in the present disclosure, a configuration may be adopted in which the widthwise sipe includes the gradually decreasing sipe width portion in which the sipe width gradually decreases from the tread surface towards the inner side in the tire radial direction, the constant sipe width portion that extends from the gradually decreasing sipe width portion towards the inner side in the tire radial direction and has a constant sipe width, and the branched sipe portion that branches and extends from the constant sipe width portion towards the inner side in the tire radial direction, while the widthwise grooves are omitted or configured as ordinary widthwise grooves. In this case, the above-described effects relating to the widthwise sipe can be achieved.

In the present example, all of the widthwise sipes 5 on the tread surface 1 have the configuration illustrated in FIG. 4. As long as one or more of the widthwise sipes 5 on the tread surface 1, however, includes the gradually decreasing sipe width portion in which the sipe width gradually decreases from the tread surface towards the inner side in the tire radial direction, the constant sipe width portion that extends from the gradually decreasing sipe width portion towards the inner side in the tire radial direction and has a constant sipe width, and the branched sipe portion that branches and extends from the constant sipe width portion towards the inner side in the tire radial direction, then the effects described above with regard to the widthwise sipe can be achieved.

For example, if in only one of the land portions, the widthwise sipe includes the gradually decreasing sipe width portion in which the sipe width gradually decreases from the tread surface towards the inner side in the tire radial direction, the constant sipe width portion that extends from the gradually decreasing sipe width portion towards the inner side in the tire radial direction and has a constant sipe width, and the branched sipe portion that branches and extends from the constant sipe width portion towards the inner side in the tire radial direction, then in that land portion, the effects described above with regard to the widthwise sipe can be achieved.

The branched groove portion is preferably formed by two branched grooves, and the intersection between the two branched grooves is preferably rounded on the inner side in the tire radial direction. The reason is that the occurrence of cracks at the intersection of the branched grooves can be suppressed, and the durability of the tire can be improved.

The intersection may be rounded by chamfering or the like, or may, for example, be provided with a notch having a substantially triangular shape in this cross-section.

The type of tread rubber preferably differs between the outer region in the tire radial direction and the inner region in the tire radial direction bounded by the tire radial position of the outermost end of the branched groove portion in the tire radial direction or by a position farther towards the outer side in the tire radial direction than the tire radial position. In this case, the hardness of the tread rubber in the inner region in the tire radial direction is preferably lower than the hardness of the tread rubber in the outer region in the tire radial direction. As a result, the wet performance (wet gripping performance) can be improved when wear progresses, at which time the inner region in the tire radial direction is used. In this case, while not specifically limited, the Young's modulus of the tread rubber in the inner region in the tire radial direction can be 80% to 90% of the Young's modulus of the tread rubber in the outer region in the tire radial direction. The Young's modulus conforms to JIS K 6254.

The branched sipe portion is preferably formed by two branched sipes, and the intersection between the two branched sipes is preferably rounded on the inner side in the tire radial direction. The reason is that the occurrence of cracks at the intersection of the branched sipes can be suppressed, and the durability of the tire can be improved.

The intersection may be rounded by chamfering or the like, or may, for example, be provided with a notch having a substantially triangular shape in this cross-section.

The type of tread rubber preferably differs between the outer region in the tire radial direction and the inner region in the tire radial direction bounded by the tire radial position of the outermost end of the branched sipe portion in the tire radial direction or by a position farther towards the outer side in the tire radial direction than the tire radial position. In this case, the hardness of the tread rubber in the inner region in the tire radial direction is preferably lower than the hardness of the tread rubber in the outer region in the tire radial direction. As a result, the wet performance (wet gripping performance) can be improved when wear progresses, at which time the inner region in the tire radial direction is used. In this case, while not specifically limited, the Young's modulus of the tread rubber in the inner region in the tire radial direction can be 80% to 90% of the Young's modulus of the tread rubber in the outer region in the tire radial direction.

The tire radial position of the outermost end of the branched groove portion in the tire radial direction and the tire radial position of the outermost end of the branched sipe portion in the tire radial direction preferably differ. The reason is that a step in rigidity in the tire radial direction can be reduced.

In this case, the tire radial position of the outermost end of the branched sipe portion in the tire radial direction is preferably farther outward, in the tire radial direction, than the tire radial position of the outermost end of the branched groove portion in the tire radial direction. The reason is that a sudden decrease in the groove volume (including the sipe volume) can be avoided.

The branched groove portion is preferably formed by two branched grooves, with the intersection between the two branched grooves preferably being rounded on the inner side in the tire radial direction, and the branched sipe portion is preferably formed by two branched sipes, with the intersection between the two branched sipes preferably being rounded on the inner side in the tire radial direction.

The reason is that the occurrence of cracks at the intersection of the branched grooves and the intersection of the branched sipes can be suppressed, and the durability of the tire can be further improved.

In this case, the radius of curvature of rounding on the inner side in the tire radial direction of the intersection between the two branched grooves is preferably smaller than the radius of curvature of rounding on the inner side in the tire radial direction of the intersection between the two branched sipes. The reason is that the occurrence of cracks at the intersection of the branched sipes, where cracks tend to occur, can be effectively suppressed.

The type of tread rubber preferably differs between the outer region in the tire radial direction and the inner region in the tire radial direction bounded by the tire radial position of the outermost end of the branched groove portion in the tire radial direction or by a position farther towards the outer side in the tire radial direction than the tire radial position, or the type of tread rubber preferably differs between the outer region in the tire radial direction and the inner region in the tire radial direction bounded by the tire radial position of the outermost end of the branched sipe portion in the tire radial direction or by a position farther towards the outer side in the tire radial direction than the tire radial position. In this case, the hardness of the tread rubber in the inner region in the tire radial direction is preferably lower than the hardness of the tread rubber in the outer region in the tire radial direction. As a result, the wet performance (wet gripping performance) can be improved when wear progresses, at which time the inner region in the tire radial direction is used. In this case, while not specifically limited, the Young's modulus of the tread rubber in the inner region in the tire radial direction can be 80% to 90% of the Young's modulus of the tread rubber in the outer region in the tire radial direction. The Young's modulus conforms to JIS K 6254.

In the above embodiment, the widthwise grooves 4 can, for example, be achieved by using a mold to form the whole groove that includes the gradually decreasing groove width portion 4a, the constant groove width portion 4b, and the branched groove portion 4c. Furthermore, the widthwise sipes 5 can, for example, be achieved by using a mold to form the gradually decreasing sipe width portion 5a, and then using a blade to form the constant sipe width portion 5b and the branched sipe portion 5c.

While embodiments of the present disclosure have been described above, the present disclosure is in no way limited to the above embodiments.

REFERENCE SIGNS LIST

1 Tread surface
2, 2a, 2b, 2c, 2d Circumferential main groove
3, 3a, 3b, 3c, 3d, 3e Land portion
4 Widthwise groove
4a Gradually decreasing groove width portion
4b Constant groove width portion
4c Branched groove portion
4c1, 4c2 Branched groove
4d Widened portion 4e Intersection
5 Widthwise sipe
5a Gradually decreasing sipe width portion
5b Constant sipe width portion
5c Branched sipe portion
5c1, 5c2 Branched sipe
5d Widened portion
5e Intersection
6 Block
CL Tire equatorial plane
TE Tread edge

The invention claimed is:

1. A pneumatic tire comprising, on a tread surface, a plurality of circumferential main grooves extending in a tread circumferential direction, and a plurality of land portions, each land portion being defined between circumferential main grooves adjacent in a tread width direction among the plurality of circumferential main grooves, or by the circumferential main groove and a tread edge, wherein the land portion includes a plurality of widthwise grooves extending in the tread width direction and a plurality of widthwise sipes extending in the tread width direction, the widthwise groove includes a gradually decreasing groove width portion in which the groove width gradually decreases from the tread surface towards an inner side in a tire radial direction, a constant groove width portion that extends from the gradually decreasing groove width portion towards the inner side in the tire radial direction and has a constant groove width, and a branched groove portion that branches and extends from the constant groove width portion towards the inner side in the tire radial direction, each widthwise sipe includes a gradually decreasing sipe width portion in which a sipe width gradually decreases from the tread surface towards an inner side in the tire radial direction, a constant sipe width portion that extends from the gradually decreasing sipe width portion towards the inner side in the tire radial direction and has a constant sipe width, and a branched sipe portion that branches and extends from the constant sipe width portion towards the inner side in the tire radial direction, the branched groove portion is formed by two branched grooves, an intersection between the two branched grooves is rounded on the inner side in the tire radial direction, the branched sipe portion is formed by two branched sipes, an intersection between the two branched sipes is rounded on the inner side in the tire radial direction, and a radius of curvature of rounding on the inner side in the tire radial direction of the intersection between the two branched grooves is smaller than a radius of curvature of rounding on the inner side in the tire radial direction of the intersection between the two branched sipes.

2. The pneumatic tire of claim 1, wherein a tire radial position of an outermost end of the branched groove portion in the tire radial direction and a tire radial position of an outermost end of the branched sipe portion in the tire radial direction differ.

3. The pneumatic tire of claim 1, wherein a type of tread rubber differs between an outer region in the tire radial direction and an inner region in the tire radial direction bounded by a tire radial position of an outermost end of the branched groove portion in the tire radial direction or by a position farther towards an outer side in the tire radial direction than the tire radial position, or the type of tread rubber differs between an outer region in the tire radial direction and an inner region in the tire radial direction bounded by a tire radial position of an outermost end of the branched sipe portion in the tire radial direction or by a position farther towards an outer side in the tire radial direction than the tire radial position.

* * * * *